United States Patent [19]

Degen et al.

[11] Patent Number: 5,344,565

[45] Date of Patent: Sep. 6, 1994

[54] METHOD OF TREATING A CLOGGED POROUS MEDIUM

[75] Inventors: Peter J. Degen, Huntington, N.Y.; Tony Alex, Kendall Park, N.J.; Michael R. Gildersleeve, Nesconset, N.Y.

[73] Assignee: Pall Corporation, East Hills, N.Y.

[21] Appl. No.: 97,450

[22] Filed: Jul. 26, 1993

[51] Int. Cl.$^5$ .............................................. B01D 65/02
[52] U.S. Cl. .................................. 210/636; 210/651; 210/321.69
[58] Field of Search ............... 210/636, 650, 651, 797, 210/321.69, 500.38

[56] References Cited

U.S. PATENT DOCUMENTS 4,340,479  7/1982  Pall ...................... 210/490
4,897,465  1/1990  Cordle et al. ............ 210/650

Primary Examiner—Frank Spear
Attorney, Agent, or Firm—Leydig, Voit & Mayer

[57] ABSTRACT

The present invention provides a method of treating a clogged porous medium comprising contacting a porous medium clogged in the course of filtering a protein-containing fluid, such as milk, beer, or wine, with an aqueous citrate solution.

30 Claims, No Drawings

1

METHOD OF TREATING A CLOGGED POROUS MEDIUM

TECHNICAL FIELD OF THE INVENTION

The present invention pertains to a method of treating a porous medium which has become clogged during use in filtering fluids, particularly protein-containing fluids such as milk.

BACKGROUND OF THE INVENTION

Porous media, particularly microporous membranes, are used to filter a variety of fluids. During the course of filtering fluids, the porous media eventually become clogged or plugged with impurities and/or other fluid components. This is particularly a problem in the filtration of protein-containing fluids. Natural proteins, such as those in milk, beer, and wine, can quickly plug porous media such as microporous membranes.

While a clogged filtration medium can be replaced, the costs involved in such replacement can be quite significant. Thus, many techniques have been developed to unclog porous media, e.g., by forwardwashing or backwashing with water, usually at high pressure and elevated temperatures. The more severe the unclogging procedure, however, the greater the cost to use the procedure. Also, since many porous media such as microporous membranes are rather delicate, severe unclogging conditions can damage the porous medium, thereby rendering it useless. The use of fluids other than water to clean the porous medium could similarly damage the porous medium or even introduce contaminants into the fluid being filtered unless entirely removed from the thus cleaned porous medium.

Accordingly, there remains a need for a method of unclogging a porous medium, particularly a microporous membrane, which will not damage the porous medium. Such a method should also not run the risk of introducing contaminants into the porous medium and/or fluid being filtered by the porous medium. The method of treating a clogged porous medium should also be such that it can be efficiently and economically used. The present invention provides such a method of treating a clogged porous medium.

These and other objects and advantages of the present invention, as well as additional inventive features, will be apparent from the description of the invention provided herein.

BRIEF SUMMARY OF THE INVENTION

The present invention provides a method of treating a clogged porous medium comprising contacting a porous medium, particularly a microporous membrane, clogged in the course of filtering a protein-containing fluid with an aqueous citrate solution. The protein-containing fluid will typically be a natural protein-containing fluid such as milk, beer, wine, or the like. The aqueous citrate solution may be applied at any temperature, e.g., ambient temperature, and at low pressures, e.g., about 0–20 psi.

DESCRIPTION OF THE PREFERRED EMBODIMENTS

The present invention is predicated on the surprising discovery that an aqueous citrate solution can be used to unclog a porous medium which has become clogged in the course of filtering a protein-containing fluid. The aqueous citrate solution can be applied to the porous medium under conditions which do not damage the porous medium and yet the aqueous citrate solution quickly and effectively unclogs the porous medium.

The present invention provides a method of treating a clogged porous medium comprising contacting a porous medium clogged in the course of filtering a protein-containing fluid with an aqueous citrate solution. The protein-containing fluid may be any such fluid, but will typically be a natural protein-containing fluid such as milk, beer, wine, or the like. The aqueous citrate solution has been found to be particularly effective in the treatment of porous media, such as microporous membranes, clogged during the filtration of milk and beer, particularly milk.

The aqueous citrate solution may be prepared in any suitable manner and is preferably an aqueous solution of a citrate salt, with no need for additional components in the solution. Suitable citrate salts include potassium and sodium citrate salts, among others, and combinations thereof. The latter is most preferred. While the aqueous citrate solution may be of any suitable concentration, it has been found that the concentration of citrate ion can be rather low, e.g., 1 wt. % or less, and still be effective. The preferred citrate concentration is about 0.1 wt. % to about 0.5 wt. %., although citrate concentrations higher than 0.5 wt. %, or even higher than 1 wt. %, can be used if necessary and desirable.

Since some natural protein-containing fluids already contain citrate ion, such as milk, the low concentration of citrate ion used in the course of practicing the present invention can avoid the inadvertent introduction of an unnatural impurity into the fluid being treated with the porous medium. Indeed, U.S. federal regulations allow for up to 0.3–0.5 wt. % citrate ion in some milk products, e.g., powdered and evaporated milk, and thus the present inventive method practiced with a dilute citrate solution is particularly well-suited for the treatment of porous media clogged in the course of filtering milk.

The present inventive method is suitable for use on any porous medium prepared from any suitable material, such as microporous membranes, metal filtration media, ceramic filters, and fibrous woven and nonwoven media. The present inventive method is particularly well-suited for use on a microporous membrane, such as those prepared in accordance with U.S. Pat. No. 4,340,479. The treatment method is especially useful in the cleaning of polyamide membranes, e.g., nylon membranes, which can be used in the filtration of a natural protein-containing fluid such as milk, in accordance, for example, with pending U.S. patent application Ser. No. 08/045,971, filed Apr. 9, 1993, and pending U.S. patent application Ser. No. 07/901,238, filed Jun. 19, 1992.

The aqueous citrate solution may be applied to the porous medium in any suitable manner and under any suitable conditions. Generally, the application conditions can be quite moderate. For example, the aqueous citrate solution can be applied in the direction of normal fluid flow, i.e., it need not be applied in the reverse flow direction. Also, the aqueous citrate solution can be applied at ambient temperature, e g , about 20–25° C. although it can also be applied at elevated temperatures, e.g., about 25° C. to about 80° C. The aqueous citrate solution can be applied at low pressures, e.g., about 30 psi or less, and even without applied pressure. Pressures of up to about 20 psi, particularly pressures of about 5 psi to about 20 psi, have been found quite effective in unclogging porous media in a reasonable period of time.

Typically, the porous medium needs to be contacted with the citrate solution for only a short period of time to achieve nearly total unclogging of the porous medium, e.g., no more than about one hour, usually no more than about 30 minutes, and typically no more than about 5 or 10 minutes. The present inventive method can be used to restore at least 50%, preferably at least 80%, or even 90% or more, of the filtrate flux of the porous medium prior to the initiation of filtration of the protein-containing fluid with the porous medium. After treatment of a porous medium with the aqueous citrate solution, the porous medium may be washed with water in a conventional manner, although, depending on the fluid being filtered with the porous medium, this may not be necessary.

The following examples further illustrate the present invention but, of course, should not be construed as in any way limiting its scope.

EXAMPLE 1

This example demonstrates the recovery of the flow rate of a porous medium clogged with a natural protein-containing fluid using a hot water flushing technique.

A Pall Corporation 6 inch diameter dynamic microfiltration unit was equipped with a 0.45 micron pore size nylon Ultipor ® N66 membrane (Pall Corporation, East Hills, New York) and integrity tested in situ in accordance with ASTM F316-86. Filtrate flux was then measured as a function of applied pressure using filtered water at ambient temperature. Filtrate flow was measured at 5, 10, 15, and 20 psi to give an indication of the effective permeability of the membrane. An initial flow delta P was thus established.

Skim milk at 50-60° C. was then filtered in accordance with the method disclosed in pending U.S. patent application Ser. No. 08/045,971, filed Apr. 9, 1993, and U.S. patent application Ser. No. 07/901,238, filed Jun. 19, 1992, until an upstream pressure of about 15 psi was reached, indicating that the membrane had substantially clogged. The membrane was then hot water flushed using water at about 75° C. and an applied pressure of 5 psi according to the method disclosed in U.S. patent application Ser. No. 07/998,371, filed Dec. 30, 1992. After about 15 minutes, a final flow delta P was determined in the same manner described above with respect to the initial flow delta P. The membrane was then again integrity tested using the same procedure described above.

The hot water flushing resulted in an 11% recovery of the initial flux. In other words, only 11% of the water flow rate of the porous medium was restored after hot water washing for 15 minutes.

EXAMPLE 2

This example demonstrates the recovery of flow rate of a porous medium clogged with a natural protein-containing fluid using the present inventive method.

A Pall Corporation 6 inch diameter dynamic microfiltration unit was equipped with a 0.45 micron pore size nylon Ultipor ® N66 membrane (Pall Corporation, East Hills, New York) and integrity tested in situ in accordance with ASTM F316-86. Filtrate flux was then measured as a function of applied pressure using filtered water at ambient temperature. Filtrate flow was measured at 5, 10, 15, and 20 psi to give an indication of the effective permeability of the membrane. An initial flow delta P was thus established.

Skim milk at 50-60° C. was then filtered in accordance with the method disclosed in pending U.S. patent application Ser. No. 08/045,971, filed Apr. 9, 1993, and U.S. patent application Ser. No. 07/901,238, filed Jun. 19, 1992, until an upstream pressure of about 15 psi was reached, indicating that the membrane had substantially clogged. The membrane was then flushed with an aqueous solution of 0.5 wt. % trisodium citrate at about 70° C. and an applied pressure of 5 psi. After about 5 minutes, a final flow delta P was determined in the same manner described above with respect to the initial flow delta P. The membrane was then again integrity tested using the same procedure described above.

The citrate solution wash resulted in a 94% recovery of the initial flux. In other words, 94% of the water flow rate of the porous medium was restored after washing with a 0.5 wt. % citrate solution. The present invention, therefore, resulted in a faster and much more complete restoration of the normal water flow rate of a porous medium as compared to the hot water wash of Example 1.

All of the references cited herein, including publications, patents, and patent applications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method of treating a clogged porous medium comprising contacting a porous medium clogged in the course of filtering a protein-containing fluid with an aqueous citrate solution.

2. The method of claim 1, wherein said protein-containing fluid is a natural protein-containing fluid.

3. The method of claim 2, wherein said protein-containing fluid is selected from the group consisting of milk, beer, and wine.

4. The method of claim 3, wherein said protein-containing fluid is milk.

5. The method of claim 1, wherein said porous medium is a microporous membrane.

6. The method of claim 5, wherein said microporous membrane is a polyamide membrane.

7. The method of claim 1, wherein said aqueous citrate solution comprises no more than about 0.5 wt. % citrate ion.

8. The method of claim 7, wherein said aqueous citrate solution is an aqueous solution of a citrate salt selected from the group consisting of potassium and sodium citrate salts and combinations thereof.

9. The method of claim 8, wherein said aqueous citrate solution is an aqueous solution of trisodium citrate.

10. The method of claim 7, wherein said protein-containing fluid is selected from the group consisting of milk, beer, and wine.

11. The method of claim 10, wherein said protein-containing fluid is milk.

12. The method of claim 11, wherein said porous medium is a microporous membrane.

13. The method of claim 12, wherein said aqueous citrate solution is an aqueous solution of trisodium citrate.

14. The method of claim 1, wherein said aqueous citrate solution is at ambient temperature.

15. The method of claim 1, wherein said aqueous citrate solution is at about 25° C. to about 80° C.

16. The method of claim 1, wherein said porous medium is contacted with said aqueous citrate solution at no more than about 30 psi.

17. The method of claim 1, wherein said porous medium is contacted with said aqueous citrate solution at about 5 psi to about 20 psi.

18. The method of claim 1, wherein said porous medium is contacted with said aqueous citrate solution for no more than about one hour.

19. The method of claim 18, wherein said porous medium is contacted with said aqueous citrate solution for no more than about 30 minutes.

20. The method of claim 19, wherein said porous medium is contacted with said aqueous citrate solution for no more than about 10 minutes.

21. The method of claim 1, wherein said clogged porous medium is contacted with said aqueous citrate solution such that said clogged porous medium achieves at least a 50% recovery of its initial water filtration flux prior to filtration with said protein-containing fluid.

22. The method of claim 21, wherein said clogged porous medium is contacted with said aqueous citrate solution such that said clogged porous medium achieves at least a 80% recovery of its initial water filtration flux prior to filtration with said protein-containing fluid.

23. The method of claim 22, wherein said clogged porous medium is contacted with said aqueous citrate solution such that said clogged porous medium achieves at least a 90% recovery of its initial water filtration flux prior to filtration with said protein-containing fluid.

24. The method of claim 21, wherein said protein-containing fluid is a natural protein-containing fluid.

25. The method of claim 24, wherein said protein-containing fluid is selected from the group consisting of milk, beer, and wine.

26. The method of claim 25, wherein said protein-containing fluid is milk.

27. The method of claim 21, wherein said porous medium is a microporous membrane.

28. The method of claim 21, wherein said aqueous citrate solution comprises no more than about 1 wt. % citrate ion.

29. The method of claim 28, wherein said aqueous citrate solution is an aqueous solution of a citrate salt selected from the group consisting of potassium and sodium citrate salts and combinations thereof.

30. The method of claim 29, wherein said aqueous citrate solution is an aqueous solution of trisodium citrate.

* * * * *